(12) United States Patent
Liu et al.

(10) Patent No.: US 12,526,178 B2
(45) Date of Patent: Jan. 13, 2026

(54) SPECTRUM SHAPING METHOD FOR NON-ORTHOGONAL WAVEFORM AND ELECTRONIC DEVICE

(71) Applicant: NTT DOCOMO, INC., Tokyo (JP)

(72) Inventors: Juan Liu, Beijing (CN); Wenjia Liu, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 406 days.

(21) Appl. No.: 18/245,786

(22) PCT Filed: Oct. 14, 2020

(86) PCT No.: PCT/CN2020/120809
§ 371 (c)(1),
(2) Date: Mar. 17, 2023

(87) PCT Pub. No.: WO2022/077251
PCT Pub. Date: Apr. 21, 2022

(65) Prior Publication Data
US 2023/0336394 A1    Oct. 19, 2023

(51) Int. Cl.
*H04L 27/26* (2006.01)

(52) U.S. Cl.
CPC ...... *H04L 27/2636* (2013.01); *H04L 27/2614* (2013.01)

(58) Field of Classification Search
CPC ............. H04L 27/2636; H04L 27/2614; H04L 27/264; H04L 27/26025; H04L 1/0058; H04L 25/025
See application file for complete search history.

(56) References Cited

U.S. PATENT DOCUMENTS

| | | | | |
|---|---|---|---|---|
| 2018/0314841 | A1* | 11/2018 | Ching | G06V 40/1365 |
| 2020/0177302 | A1* | 6/2020 | Nikitopoulos | H04W 52/243 |
| 2023/0224204 | A1* | 7/2023 | Feng | H04L 27/2607 |
| | | | | 375/260 |

FOREIGN PATENT DOCUMENTS

| | | |
|---|---|---|
| CN | 110393030 A | 10/2019 |
| CN | 110710174 A | 1/2020 |
| CN | 111066361 A | 4/2020 |

OTHER PUBLICATIONS

Office Action issued in counterpart Chinese Application No. 202080105121.6, mailed Apr. 18, 2024 (12 pages).
Chinese Search Report issued in Chinese Application No. 202080105121.6, mailed Apr. 18, 2024 (3 pages).

\* cited by examiner

*Primary Examiner* — Iqbal Zaidi
(74) *Attorney, Agent, or Firm* — Osha Bergman Watanabe & Burton LLP

(57) ABSTRACT

The present disclosure provides a spectrum shaping method for non-orthogonal waveforms and an electronic device. The electronic device includes: a processing unit configured to perform discrete Fourier transform spreading on data to be transmitted to obtain a spread signal, perform subcarrier mapping on the spread signal, perform spectrum shaping on subcarriers by using a spectrum shaping factor to obtain a shaped signal, and obtain a non-orthogonal Faster-Than-Nyquist signal according to the shaped signal; and a transmitting unit configured to transmit the non-orthogonal Faster-Than-Nyquist signal.

8 Claims, 5 Drawing Sheets

SPECTRUM SHAPING METHOD FOR NON-ORTHOGONAL WAVEFORM AND ELECTRONIC DEVICE

TECHNICAL FIELD

The present disclosure relates to a field of wireless communication, and more particularly, to a spectrum shaping method for non-orthogonal waveform (NOW) and a corresponding electronic device.

BACKGROUND

In order to meet the extremely high data rate requirements of Evolved 5G and 6G, high frequency band related technologies such as millimeter wave (mmWave) and terahertz (THz) frequencies have been regarded as recommended technologies in Evolved 5G and 6G communications. System design with large bandwidth and high frequency band is limited by nonlinearity of Power Amplifiers (PAs). High spectrum efficiency, high power efficiency and high flexibility should be considered in waveform design to support more schemes. Due to the high Peak-to-Average Power Ratio (PAPR), orthogonal frequency division multiplexing waveform with cyclic prefix (CP-OFDM) will show signal distortion and performance degradation under the influence of the nonlinearity of power amplifiers. In this case, Discrete Fourier Transform spread Orthogonal Frequency Division Multiplexing (DFT-s-OFDM) waveform applied to 4G and 5G uplinks has an advantage of low peak to average power ratio, and can be regarded as a candidate waveform for Evolved 5G and 6G.

On the other hand, orthogonal waveform has been close to the Shannon limit, and the space for further improving spectrum efficiency is very limited. Non-orthogonal Faster-Than-Nyquist (FTN) can improve SE by increasing signal transmission rate on Nyquist. By using DFT-s-OFDM and time-domain non-orthogonal FTN (hereinafter, a scheme using DFT-s-OFDM and non-orthogonal time-domain FTN for communication will be referred to as "NOW" scheme for short), high spectrum efficiency and high power efficiency can be achieved. In the NOW scheme, conversion between orthogonal waveforms and non-orthogonal waveforms may be performed by adjusting a time-domain compression factor, or the time-domain compression factor may be adjusted according to different scenarios to achieve the requirements of high throughput, low PAPR, high reliability and the like.

However, spectrum truncation exists when transmitting in the NOW scheme. Compared with orthogonal waveforms, CP-OFDM and DFT-s-OFDM, Signal-to-Noise Ratio (SNR) loss will be very serious when high spectrum efficiency and high power efficiency are obtained.

SUMMARY

According to an aspect of the present disclosure, an electronic device is provided. The electronic device comprises: a processing unit configured to perform discrete Fourier transform spreading on data to be transmitted to obtain a spread signal, perform subcarrier mapping on the spread signal, perform spectrum shaping on subcarriers by using a spectrum shaping factor to obtain a shaped signal, and obtain a non-orthogonal Faster-Than-Nyquist signal according to the shaped signal; and a transmitting unit configured to transmit the non-orthogonal Faster-Than-Nyquist signal.

According to another aspect of the present disclosure, a spectrum shaping method for non-orthogonal waveforms is provided, comprising: performing discrete Fourier transform spreading on data to be transmitted to obtain a spread signal; performing subcarrier mapping on the spread signal; performing spectrum shaping on subcarriers by using a spectrum shaping factor to obtain a shaped signal; obtaining a non-orthogonal Faster-Than-Nyquist signal according to the shaped signal; and transmitting the non-orthogonal Faster-Than-Nyquist signal.

BRIEF DESCRIPTION OF DRAWINGS

The above and other objects, features and advantages of the present disclosure will become more apparent by describing embodiments of the present disclosure in more detail with reference to accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals generally represent like parts or steps.

DETAILED DESCRIPTION

Figure 1:
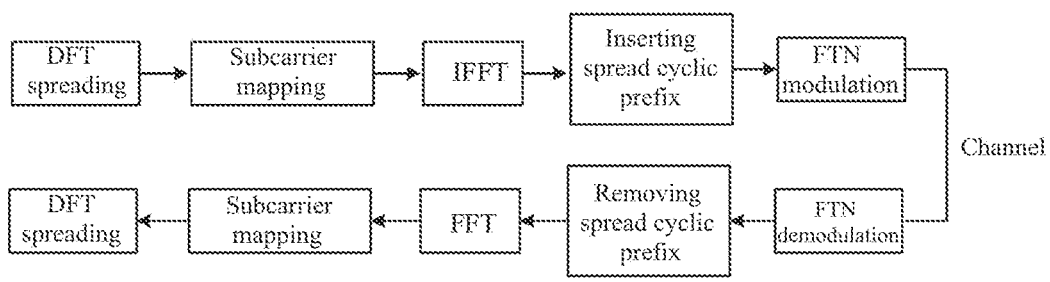
FIG. 1 is a schematic block diagram illustrating transmission of signals using the NOW scheme.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure. In addition, terminals described herein may include various types of terminals, such as User Equipment (UE), mobile terminals (or referred to as mobile stations) or fixed terminals. However, for convenience, terminals and UE are sometimes used interchangeably hereinafter.

FIG. 1 is a schematic block diagram illustrating transmission of signals using the NOW scheme. As shown in FIG. 1, a transmitting device performs Discrete Fourier Transform (DFT) spreading on data to be transmitted to obtain a spread signal. Then, subcarrier mapping is performed on the spread signal to map the spread signal to various subcarriers. Next, the transmitting device performs Inverse Fast Fourier Transform (IFFT) on the various subcarriers, and inserts a spread cyclic prefix into the signal after IFFT, thus avoiding interference between DFT-s-OFDM symbols and supporting a Minimum Mean Square Error-Decision Feedback Equalizer (MMSE-DFE) at a receiving device. Finally, the signal with cyclic prefix inserted is subjected to non-orthogonal Faster-Than-Nyquist (FTN) modulation to compress the whole DFT-s-OFDM time-domain symbols, and the non-orthogonal Faster-Than-Nyquist modulated signal is transmitted via a channel. In particular, the non-orthogonal Faster-Than-Nyquist modulation may include up-sampling a signal with a cyclic prefix inserted, and pulse shaping the up-sampled signal.

On the other hand, as shown in FIG. 1, the receiving device performs non-orthogonal Faster-Than-Nyquist demodulation on the received signal. In particular, the non-orthogonal Faster-Than-Nyquist demodulation may include performing match filtering of the received signal and down-sampling of the filtered signal. Then, the cyclic prefix of the non-orthogonal Faster-Than-Nyquist demodulated signal is removed, and the signal from which the cyclic prefix is removed is subjected to Fast Fourier Transform (FFT). Next, the receiving device performs minimum mean square error decision feedback equalization and inter-symbol interference cancellation on the signal after FFT, and performs subcarrier mapping. Finally, DFT spreading is performed on the mapped signal. Thereby, the requirements of high throughput, low PAPR, high reliability and the like are realized.

As mentioned above, there is a problem that frequency spectrum is truncated when transmitting in the NOW scheme. In particular, by analyzing a signal spectrum of the NOW scheme, an optimal time-domain compression factor can be obtained without truncating useful signal spectrum, and if the time-domain compression factor is less than the optimal value, the useful signal spectrum will be truncated. Although high spectrum efficiency and high power efficiency can be achieved when using NOW scheme for transmission, SNR loss is serious. Therefore, there is a need for a method and corresponding electronic device to reduce spectrum truncation and SNR loss when transmitting using the NOW scheme.

Figure 2:
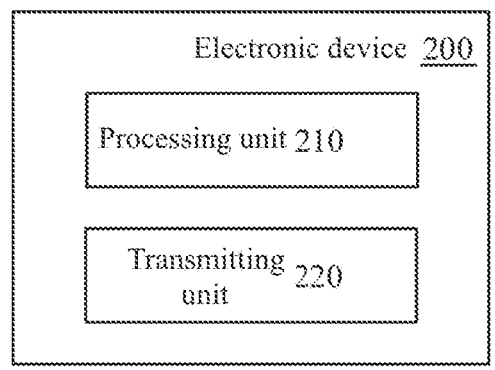
FIG. 2 is a schematic block diagram illustrating an electronic device according to one embodiment of the present disclosure.

In the embodiments according to the present disclosure, it is proposed to carry out frequency-domain spectrum shaping on subcarriers after performing subcarrier mapping on a signal to be transmitted to reduce the problem caused by spectrum truncation. An electronic device 200 according to an embodiment of the present disclosure will be described below with reference to FIG. 2. FIG. 2 is a schematic block diagram illustrating an electronic device according to an embodiment of the present disclosure. As shown in FIG. 2, a transmitting device 200 according to an embodiment of the present disclosure may include a processing unit 210 and a transmitting unit 220. In addition to the processing unit and the transmitting unit, the electronic device 200 may also include other components, however, since these components are irrelevant to the contents of the embodiment of the present disclosure, illustrations and descriptions thereof are omitted herein.

As shown in FIG. 2, the processing unit 210 performs discrete Fourier transform spreading on data to be transmitted to obtain a spread signal, performs subcarrier mapping on the spread signal, performs spectrum shaping on subcarriers by using a spectrum shaping factor to obtain a shaped signal, and obtains a non-orthogonal Faster-Than-Nyquist signal according to the shaped signal. According to an example of the disclosure, the spectrum shaping factor may include an amplitude shaping factor. The processing unit 210 may performs spectrum shaping on the subcarriers by using the amplitude shaping factor, to reduce power of subcarriers truncated due to non-orthogonal Faster-Than-Nyquist modulation.

For example, the amplitude shaping factor for each subcarrier may be determined according to frequency-domain values of a specific pulse function. For example, spectrum shaping may be performed on the subcarriers by a root raised cosine function. In this case, the amplitude shaping factor for each subcarrier may be determined according to frequency-domain values of the root raised cosine function. Furthermore, the amplitude shaping factor may also be determined according to a number of subcarriers truncated in FTN modulation and a total number of subcarriers.

Figure 3:
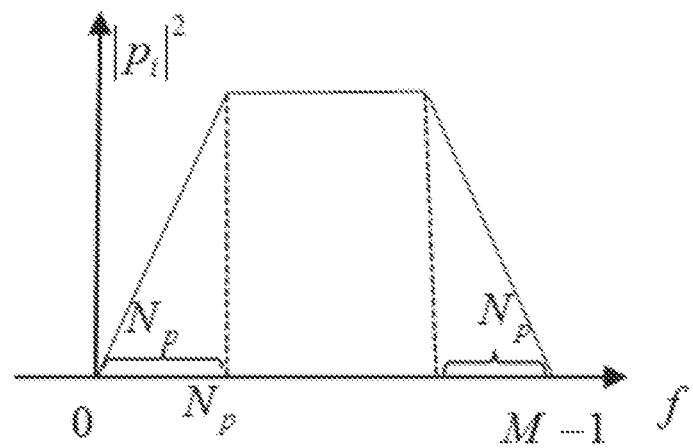
FIG. 3 is a schematic diagram illustrating squares of absolute values of an amplitude shaping factor determined according to frequency-domain values of a root raised cosine function according to an example of the present disclosure.

FIG. 3 is a schematic diagram illustrating squares of absolute values of the amplitude shaping factor determined according to frequency-domain values of the root raised cosine function according to an example of the present disclosure. In the example shown in FIG. 3, the root raised cosine function h(t) is Fourier transformed to obtain its frequency-domain values as shown in the following Formula 1:

$$H(f) = \begin{cases} T\sin\left(\dfrac{\pi f T}{2\beta}\right), & 0 < f \le \dfrac{\beta}{T} \\ T, & \dfrac{\beta}{T} \le f \le \dfrac{1}{T}, \text{ where } \beta = \dfrac{N_p}{M - N_p} \\ T\sin\left(\dfrac{\pi(fT-1)}{2\beta} + \dfrac{\pi}{2}\right), & \dfrac{1}{T} < f \le \dfrac{1+\beta}{T} \end{cases} \quad (1)$$

where T is a sampling interval, $\beta$ is a roll-off factor, $N_p$ is a number of single side truncated subcarriers in FTN modulation, and M is a total number of subcarriers.

Therefore, an absolute value $|P_i|$ of the amplitude shaping factor for each subcarrier may be obtained according to the frequency-domain values of the root raised cosine function h(t), as shown in the following Formula (2):

$$|p_i| = \begin{cases} \dfrac{1}{\sqrt{M - N_p}} \sin\left(\dfrac{\pi i}{2N_p}\right), & 0 \le i \le N_p \\ \dfrac{1}{\sqrt{M - N_p}}, & N_p < i \le M - N_p \\ \dfrac{1}{\sqrt{M - N_p}} \cos\left[\dfrac{\pi(i - (M - N_p))}{2N_p}\right], & M - N_p \le i \le M - 1 \end{cases} \quad (2)$$

where $2N_p$ is a number of subcarriers truncated in FTN modulation, indexes of truncated subcarriers are $\{0 \le i \le N_p\} \cup \{M - N_p \le i \le M - 1\}$, and indexes of non-truncated subcarriers are $\{N_p < i < M - N_p\}$.

The absolute value $|P_i|$ of the amplitude shaping factor for each subcarrier may represent a power distribution weight of the subcarrier, and the sum of squares of absolute values of the amplitude shaping factor for all subcarriers is 1, that is, $$\sum_{i=0}^{M-1} |p_i|^2 = 1.$$

Therefore, power of each subcarrier may be adjusted by the amplitude shaping factor. As shown in FIG. 3, absolute values $|P_i|$ of the amplitude shaping factor for subcarriers 0 to $N_p$ and $M-N_p$ to $M-1$ truncated in FTN modulation are small, thereby suppressing power of the truncated subcarriers. On the other hand, absolute values $|P_i|$ of the amplitude shaping factor for subcarriers $N_p+1$ to $M-N_p$ that are not truncated in FTN modulation are large, that is, power of the non-truncated subcarriers is not suppressed. Therefore, power of subcarriers with truncated spectrum is reduced, and power of non-truncated subcarriers will occupy a larger proportion in the total transmission power, thus improving the signal-to-noise ratio.

The amplitude shaping factor $P_i$ for each subcarrier may be further obtained according to the above Formula (2), as shown in the following Formula (3):

$$p_i = \begin{cases} \frac{a_i}{\sqrt{M-N_p}} \sin\left(\frac{\pi i}{2N_p}\right), & 0 \le i \le N_p \\ \frac{a_i}{\sqrt{M-N_p}}, & N_p < i \le M-N_p \\ \frac{a_i}{\sqrt{M-N_p}} \cos\left[\frac{\pi(i-(M-N_p))}{2N_p}\right], & M-N_p \le i \le M-1 \end{cases} \quad (3)$$

where $\alpha_i$ is a phase shaping factor in the spectrum shaping factor.

In the example shown in FIG. 3, determination of the amplitude shaping factor for each subcarrier directly based on frequency-domain values of a specific pulse function is described as an example. Alternatively, the amplitude shaping factor for each subcarrier may also be determined based on frequency-domain values of DFT parameters of a specific pulse function.

Furthermore, according to another example of the present disclosure, the amplitude shaping factor for each subcarrier may be determined according to power levels of subcarriers with truncated spectrum and subcarriers without truncated spectrum in non-orthogonal Faster-Than-Nyquist modulation. For example, the amplitude shaping factor may include a first amplitude shaping factor for subcarriers whose spectrum is truncated in FTN modulation and a second amplitude shaping factor for subcarriers whose spectrum is not truncated in FTN modulation. The first amplitude shaping factor may be smaller than the second amplitude shaping factor, thus reducing power of the subcarriers with truncated spectrum, and power of the non-truncated subcarriers will occupy a larger proportion in the total transmission power, which improves the signal-to-noise ratio.

Figure 4A:
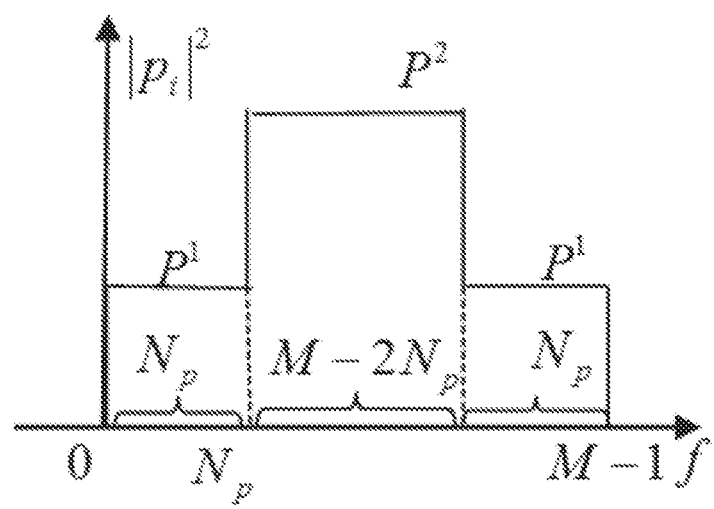
FIGS. 4A-4C are schematic diagrams illustrating an amplitude shaping factor determined according to power levels of subcarriers with truncated spectrum and subcarriers without truncated spectrum in FTN modulation, according to an example of the present disclosure.
Figure 4B:
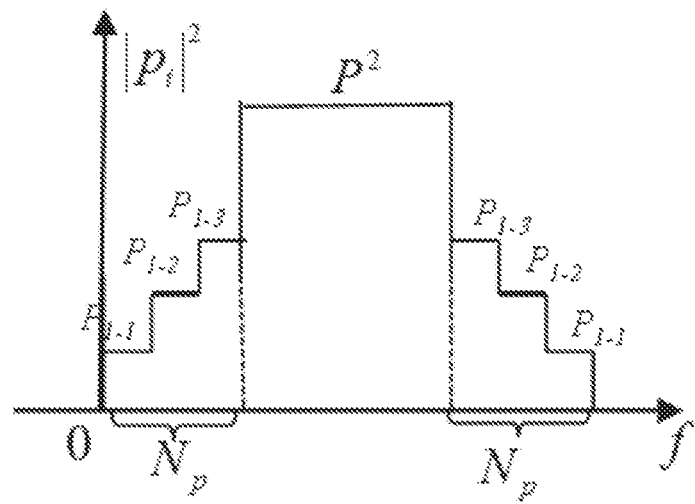
Figure 4C:
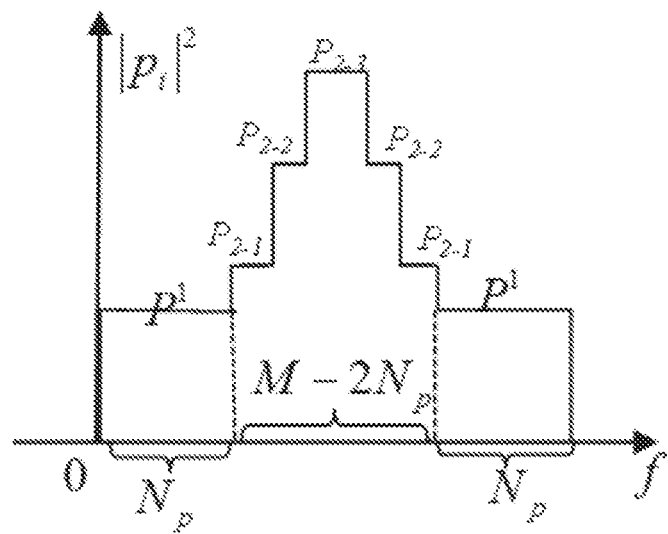

FIGS. 4A-4C are schematic diagrams illustrating an amplitude shaping factor determined according to power levels of subcarriers with truncated spectrum and subcarriers without truncated spectrum in FTN modulation, according to an example of the present disclosure. In the examples shown in FIGS. 4A-4C, the amplitude shaping factor for subcarriers whose spectrum is truncated in FTN modulation is the first amplitude shaping factor, and the amplitude shaping factor for subcarriers whose spectrum is not truncated in FTN modulation is the second amplitude shaping factor. Similar to the example shown in FIG. 3, in FIGS. 4A-4C, the absolute value $|P_i|$ of the amplitude shaping factor for each subcarrier may represent a power distribution weight of the subcarrier, and the sum of squares of absolute values of the amplitude shaping factor for all subcarriers is 1, that is, $$\sum_{i=11}^{M-1} |p_i|^2 = 1.$$

As shown in FIGS. 4A-4C, the square of the absolute value of the first amplitude shaping factor is smaller than the square of the absolute value of the second amplitude shaping factor, thereby suppressing power of subcarriers with truncated spectrum.

In the example shown in FIG. 4A, an amplitude shaping factor $P_1$ is set for all subcarriers whose spectrum is truncated in FTN modulation, and an amplitude shaping factor $P_2$ is also set for all subcarriers whose spectrum is not truncated in FTN modulation. In other words, power levels of all subcarriers whose spectrum is truncated in FTN modulation are the same, and power levels of all subcarriers whose spectrum is not truncated in FTN modulation are the same.

Alternatively, amplitude shaping factors respectively corresponding to a plurality of power levels may be set for subcarriers whose spectrum is truncated in FTN modulation. For example, as shown in FIG. 4B, the first amplitude shaping factor for subcarriers whose spectrum is truncated in FTN modulation includes three elements, namely, $P_{1-1}$ to $P_{1-3}$. Therefore, power of a part of subcarriers whose spectrum is truncated in FTN modulation may be adjusted to a power level corresponding to $P_{1-1}$, power of a part of subcarriers may be adjusted to a power level corresponding to $P_{1-2}$, and power of the remaining subcarriers whose spectrum is truncated in FTN modulation may be adjusted to a power level corresponding to $P_{1-3}$. The three elements $P_{1-1}$ to $P_{1-3}$ included in the first amplitude shaping factor are all smaller than the amplitude shaping factor $P_2$ for subcarriers whose spectrum is not truncated in FTN modulation.

Similarly, amplitude shaping factors respectively corresponding to a plurality of power levels may also be set for subcarriers whose spectrum is not truncated in FTN modulation. For example, as shown in FIG. 4C, the second amplitude shaping factor for subcarriers whose spectrum is not truncated in FTN modulation includes three elements, namely, $P_{2-1}$ to $P_{2-3}$. Therefore, power of a part of subcarriers whose spectrum is not truncated in FTN modulation may be adjusted to a power level corresponding to $P_{2-1}$, power of a part of subcarriers may be adjusted to a power level corresponding to $P_{2-2}$, and power of the remaining subcarriers whose spectrum is not truncated in FTN modulation may be adjusted to a power level corresponding to $P_{2-3}$. The three elements $P_{2-1}$ to $P_{2-3}$ included in the second amplitude shaping factor are all larger than the amplitude shaping factor $P_1$ for subcarriers whose spectrum is truncated in FTN modulation.

In addition, amplitude shaping factors respectively corresponding to a plurality of power levels may also be set for subcarriers whose spectrum is not truncated and subcarriers whose spectrum is truncated in FTN modulation. Amplitude shaping factors set for subcarriers whose spectrum is truncated in FTN modulation may all be smaller than those set for subcarriers whose spectrum is not truncated in FTN modulation.

Returning to FIG. 2, according to another example of the present disclosure, the spectrum shaping factor may further include a phase shaping factor, and the processing unit 210 may further perform spectrum shaping on the subcarriers by using the phase shaping factor, to reduce influence of non-orthogonal Faster-Than-Nyquist modulation on a high peak-to-average power ratio. For example, the spectrum shaping factor may be an element in a phase set $$\left\{0, \frac{\pi}{4}, \frac{\pi}{2}, \frac{3\pi}{4}\right\}.$$

After obtaining the spectrum-shaped signal, the processing unit 210 may determine a non-orthogonal Faster-Than-Nyquist signal according to the shaped signal. And the transmitting unit 220 may transmit according to the determined non-orthogonal Faster-Than-Nyquist signal. For example, referring to the schematic diagram shown in FIG. 1, the processing unit 210 may perform spectrum shaping after subcarrier mapping, and perform Inverse Fast Fourier Transform (IFFT), spread cyclic prefix insertion, and non-orthogonal Faster-Than-Nyquist (FTN) modulation on the spectrum-shaped signal. Accordingly, a receiving device may perform a processing opposite to the spectrum shaping described above in connection with FIGS. 2-4 on the received signal. For example, in the schematic block diagram of signal transmission using the NOW scheme shown in FIG. 1, the receiving device may perform the processing opposite to the spectrum shaping described above after performing minimum mean square error decision feedback equalization on the signal after FFT.

In the electronic device according to the present disclosure, by performing spectrum shaping on signals to be transmitted, power of truncated spectrum part can be suppressed, improving SNR and reducing out-of-band leakage at the same time.

According to an embodiment of the present disclosure, the electronic device 200 may need to perform spectrum shaping on a signal to be transmitted by default, unless information indicating not to perform spectrum shaping is received, and vice versa. For example, the electronic device 200 may further include a receiving unit. The receiving unit may receive shaping indication information indicating whether spectrum shaping is to be performed. The processing unit 210 may determine whether to perform spectrum shaping on the subcarriers by using the spectrum shaping factor to obtain the shaped signal according to the received shaping indication information. For example, the electronic device 200 may be instructed whether to perform spectrum shaping through high-layer signaling such as Radio Resource Control (RRC) signaling, Downlink Control Information (DCI) and the like.

Accord to an embodiment of that present disclosure, the spectrum shaping factor may be set in advance. Alternatively, information about the spectrum shaping factor may also be received, where the information about the spectrum shaping factor may indicate the spectrum shaping factor implicitly or explicitly.

For example, the electronic device 200 may further include a receiving unit. The receiving unit may receive a reference signal such as a channel reference signal, and the processing unit 210 may determine the spectrum shaping factor according to the reference signal. As another example, the receiving unit may receive transfer function type information and information about a time-domain compression factor of non-orthogonal Faster-Than-Nyquist modulation. The processing unit 210 may determine the spectrum shaping factor according to the transfer function type information and the information about the time-domain compression factor of the non-orthogonal Faster-Than-Nyquist modulation. In particular, the processing unit 210 may determine subcarriers with truncated spectrum according to the time-domain compression factor, and obtain the spectrum shaping factor according to the subcarriers with truncated spectrum.

Furthermore, according to the time-domain compression factor of the non-orthogonal Faster-Than-Nyquist modulation, a power distribution vector about subcarriers with truncated spectrum and subcarriers without truncated spectrum may be set in advance, and a codebook corresponding to the power distribution vector may be stored. Therefore, the processing unit 210 may determine the amplitude spectrum shaping factor based on the codebook of the power distribution vector according to the time-domain compression factor received by the receiving unit.

Furthermore, in the case that the processing unit 210 determines the amplitude shaping factor for each subcarrier according to power levels of subcarriers with truncated spectrum and subcarriers without truncated spectrum in non-orthogonal Faster-Than-Nyquist modulation, a power level table about the subcarriers with truncated spectrum and the subcarriers without truncated spectrum may be set in advance according to the time-domain compression factor of the non-orthogonal Faster-Than-Nyquist modulation. For example, a number of subcarriers in each power level may be determined according to a proportion of different power levels in a region where the spectrum is truncated or not. As another example, in the case that the time-domain compression factor is a non-ideal time-domain compression factor, the number of subcarriers in each power level may be set in advance. The receiving unit may receive information about proportions of different power levels, so that the processing unit 210 may determine the amplitude spectrum shaping factor based on the preset power level table according to the proportions of different power levels.

Furthermore, the receiving unit may also receive high-layer signaling such as RRC to indicate the phase spectrum shaping factor.

Figure 5:
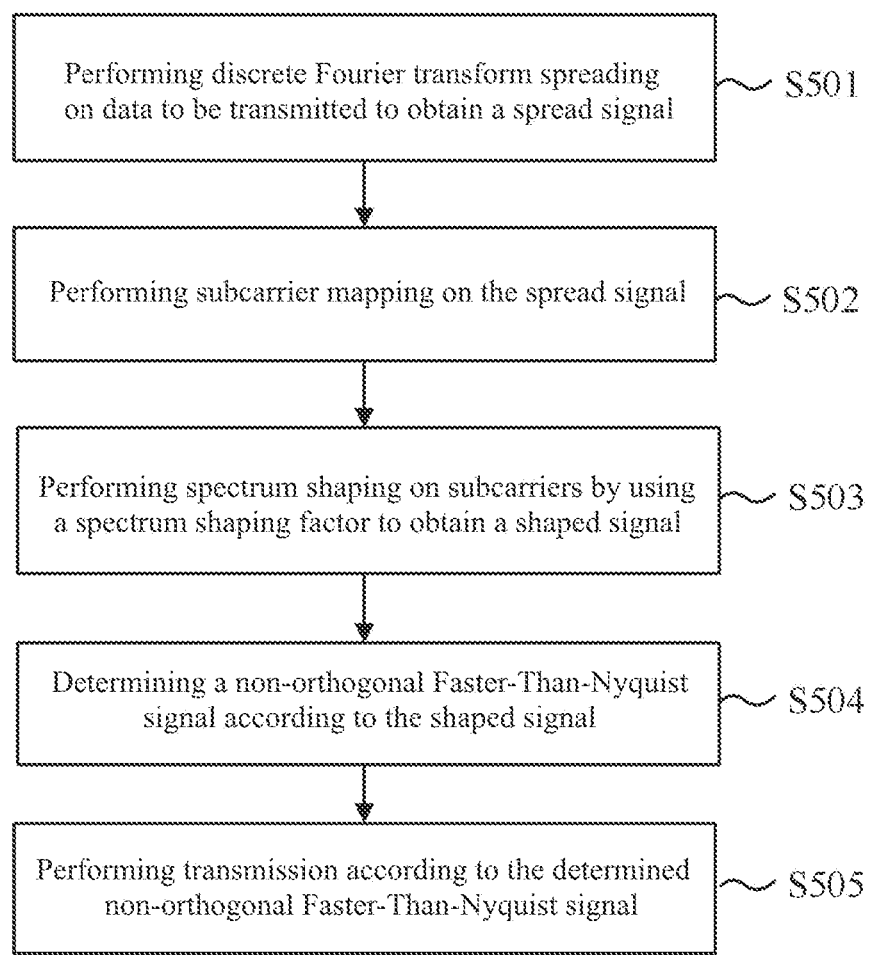
FIG. 5 is a flowchart of a spectrum shaping method for non-orthogonal waveforms according to an embodiment of the present disclosure.

A spectrum shaping method for non-orthogonal waveforms according to an embodiment of the present disclosure will be described below with reference to FIG. 5. FIG. 5 is a flowchart of a spectrum shaping method 500 for non-orthogonal waveforms according to an embodiment of the present disclosure. Since steps of the signal envelope acquisition method 500 correspond to the operations of the electronic device 200 described above with reference to the drawings, a detailed description of the same content is omitted herein for the sake of simplicity.

As shown in FIG. 5, in step S501, discrete Fourier transform spreading is performed on data to be transmitted to obtain a spread signal. In step S502, subcarrier mapping is performed on the spread signal. Then, in step S503, spectrum shaping is performed on subcarriers by using a spectrum shaping factor to obtain a shaped signal. According to an example of the present disclosure, the spectrum shaping factor may include an amplitude shaping factor. In step S503, spectrum shaping may be performed on the subcarriers by using the amplitude factor, to reduce power of subcarriers truncated due to non-orthogonal Faster-Than-Nyquist modulation.

For example, in step S503, the amplitude shaping factor for each subcarrier may be determined according to frequency-domain values of a specific pulse function. For example, spectrum shaping may be performed on the subcarriers by a root raised cosine function. In this case, the amplitude shaping factor for each subcarrier may be determined according to frequency-domain values of the root raised cosine function. This has been described in detail above with reference to FIG. 3 and Formulas (1)-(3), so it will not be repeatedly described herein.

Determination of the amplitude shaping factor for each subcarrier directly based on frequency-domain values of a specific pulse function is described as an example. Alternatively, the amplitude shaping factor for each subcarrier may also be determined based on frequency-domain values of DFT parameters of a specific pulse function. Furthermore, in step S503, the amplitude shaping factor may also be determined according to a number of subcarriers truncated in FTN modulation and a total number of subcarriers.

Furthermore, according to another example of the present disclosure, in step S503, the amplitude shaping factor for each subcarrier may be determined according to power levels of subcarriers with truncated spectrum and subcarriers without truncated spectrum in non-orthogonal Faster-Than-Nyquist modulation. For example, the amplitude shaping factor may include a first amplitude shaping factor for subcarriers whose spectrum is truncated in FTN modulation and a second amplitude shaping factor for subcarriers whose spectrum is not truncated in FTN modulation. The first amplitude shaping factor may be smaller than the second amplitude shaping factor, thus reducing power of the subcarriers with truncated spectrum, and power of the non-truncated subcarriers will occupy a larger proportion in the total transmission power, which improves the signal-to-noise ratio. This has been described in detail above with reference to FIG. 4, so it will not be repeatedly described herein.

According to another example of the present disclosure, the spectrum shaping factor may further include a phase shaping factor. In step S503, spectrum shaping may also be performed on the subcarriers by using the phase shaping factor, to reduce influence of non-orthogonal Faster-Than-Nyquist modulation on a high peak-to-average power ratio. For example, the spectrum shaping factor may be an element in a phase set $\{0, \pi/4, \pi/2, 3\pi/4\}$.

After obtaining the spectrum-shaped signal, in step S504, a non-orthogonal Faster-Than-Nyquist signal may be determined according to the shaped signal. And in step S505, transmission may be performed according to the determined non-orthogonal Faster-Than-Nyquist signal. For example, referring to the schematic diagram shown in FIG. 1, spectrum shaping may be performed after subcarrier mapping, and Inverse Fast Fourier Transform (IFFT), spread cyclic prefix insertion, and non-orthogonal Faster-Than-Nyquist (FTN) modulation may be performed on the spectrum-shaped signal.

In the electronic device according to the present disclosure, by performing spectrum shaping on signals to be transmitted, power of truncated spectrum part can be suppressed, improving SNR and reducing out-of-band leakage at the same time.

According to an embodiment of the present disclosure, spectrum shaping of a signal to be transmitted may be required by default, unless information indicating not to perform spectrum shaping is received, and vice versa. For example, the method 500 may further include receiving shaping indication information indicating whether spectrum shaping is to be performed. In step S503, whether to perform spectrum shaping on the subcarriers by using the spectrum shaping factor to obtain the shaped signal may be determined according to the received shaping indication information. For example, whether to perform spectrum shaping may be instructed through high-layer signaling such as Radio Resource Control (RRC) signaling, Downlink Control Information (DCI) and the like.

Accord to an embodiment of that present disclosure, the spectrum shaping factor may be set in advance. Alternatively, information about the spectrum shaping factor may also be received, where the information about the spectrum shaping factor may indicate the spectrum shaping factor implicitly or explicitly.

For example, the method 500 may further include receiving a reference signal such as a channel reference signal, and the spectrum shaping factor may be determined according to the reference signal in step S503. As another example, the receiving unit may receive transfer function type information and information about a time-domain compression factor of non-orthogonal Faster-Than-Nyquist modulation. In step S503, the spectrum shaping factor may be determined according to the transfer function type information and the information about the time-domain compression factor of the non-orthogonal Faster-Than-Nyquist modulation. In particular, in step S503, subcarriers with truncated spectrum may be determined according to the time-domain compression factor, and the spectrum shaping factor may be obtained according to the subcarriers with truncated spectrum.

Furthermore, according to the time-domain compression factor of the non-orthogonal Faster-Than-Nyquist modulation, a power distribution vector about subcarriers with truncated spectrum and subcarriers without truncated spectrum may be set in advance, and a codebook corresponding to the power distribution vector may be stored. Therefore, in step S503, the amplitude spectrum shaping factor may be determined based on the codebook of the power distribution vector according to the time-domain compression factor received by the receiving unit.

Furthermore, in the case that the amplitude shaping factor for each subcarrier is determined according to power levels of subcarriers with truncated spectrum and subcarriers without truncated spectrum in non-orthogonal Faster-Than-Nyquist modulation, a power level table about the subcarriers with truncated spectrum and the subcarriers without truncated spectrum may be set in advance according to the time-domain compression factor of the non-orthogonal Faster-Than-Nyquist modulation. For example, a number of subcarriers in each power level may be determined according to a proportion of different power levels in a region where the spectrum is truncated or not. As another example, in the case that the time-domain compression factor is a non-ideal time-domain compression factor, the number of subcarriers in each power level may be set in advance. The receiving unit may receive information about proportions of different power levels, so that the amplitude spectrum shaping factor may be determined based on the preset power level table according to the proportions of different power levels in step S503.

Furthermore, the method 500 may further include receiving high-layer signaling such as RRC to indicate the phase spectrum shaping factor.

<Hardware Structure>

In addition, block diagrams used in the description of the above embodiments illustrate blocks in units of functions. These functional blocks (structural units) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 6:
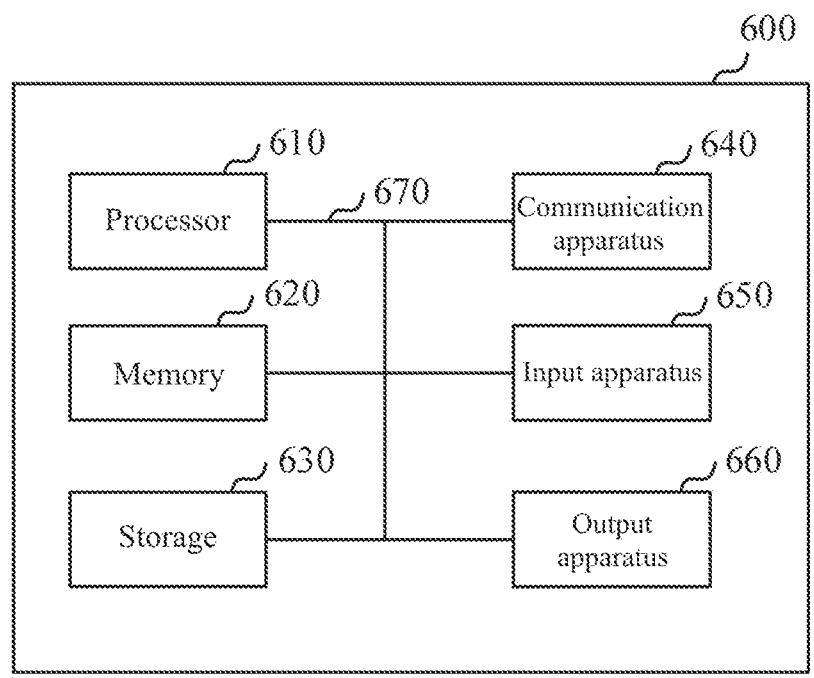
FIG. 6 is a schematic diagram of a hardware structure of a device involved according to an embodiment of the present disclosure.

For example, an electronic device according to an embodiment of the present disclosure may function as a computer that executes the processes of the wireless communication method of the present disclosure. FIG. 6 is a schematic diagram of a hardware structure of a device 600 (a base station or terminal) involved in an embodiment of the present disclosure. The above device 600 (a base station or terminal) may be constituted as a computer apparatus that physically comprises a processor 610, a memory 620, a storage 630, a communication apparatus 640, an input apparatus 650, an output apparatus 660, a bus 670 and the like In addition, in the following description, terms such as "apparatus" may be replaced with circuits, devices, units, and the like. The hardware structure of the user terminal and the base station may include one or more of the respective apparatuses shown in the figure, or may not include a part of the apparatuses.

For example, only one processor 610 is illustrated, but there may be multiple processors. Furthermore, processes may be performed by one processor, or processes may be performed by more than one processor simultaneously, sequentially, or with other methods. In addition, the processor 610 may be installed by more than one chip.

Respective functions of the device 600 may be implemented, for example, by reading specified software (program) into hardware such as the processor 610 and the memory 620, so that the processor 610 performs computations, controls communication performed by the communication apparatus 640, and controls reading and/or writing of data in the memory 620 and the storage 630.

The processor 610, for example, operates an operating system to control the entire computer. The processor 610 may be constituted by a Central Processing Unit (CPU), which includes interfaces with peripheral apparatuses, a control apparatus, a computing apparatus, a register and the like. For example, the processing unit described above may be implemented by the processor 610.

In addition, the processor 610 reads programs (program codes), software modules, data and the like from the storage 630 and/or the communication apparatus 640 to the memory 620, and execute various processes according to them. As for the program, a program causing computers to execute at least a part of the operations described in the above embodiments may be employed. For example, the processing unit of the electronic device may be implemented by a control program stored in the memory 620 and operated by the processor 610, and other functional blocks may also be implemented similarly.

The memory 620 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 620 may also be referred to as a register, a cache, a main memory (a main storage apparatus) and the like. The memory 620 may store executable programs (program codes), software modules and the like for implementing a method involved in an embodiment of the present disclosure.

The storage 630 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 630 may also be referred to as an auxiliary storage apparatus.

The communication apparatus 640 is a hardware (transceiver device) performing communication between computers via a wired and/or wireless network, and is also referred to as a network device, a network controller, a network card, a communication module and the like, for example. The communication apparatus 640 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 640.

The input apparatus 650 is an input device (e.g., a keyboard, a mouse, a microphone, a switch, a button, a sensor and the like) that receives input from the outside. The output apparatus 660 is an output device (e.g., a display, a speaker, a Light Emitting Diode (LED) light and the like) that performs outputting to the outside. In addition, the input apparatus 650 and the output apparatus 660 may also be an integrated structure (e.g., a touch screen).

Furthermore, the respective apparatuses such as the processor 610 and the memory 620 are connected by the bus 670 that communicates information. The bus 670 may be constituted by a single bus or by different buses between the apparatuses.

Furthermore, the electronic device may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 610 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed through a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Block (MIB), System Information Block (SIB), etc.), Medium Access Control (MAC) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by the first communication device or the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The respective manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM®R), Code Division Multiple Access 3000 (CDMA 3000), Ultra Mobile Broadband (UMB), IEEE 920.11 (Wi-Fi®), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. An electronic device, comprising:
a processing unit configured to perform discrete Fourier transform spreading on data to be transmitted to obtain a spread signal, perform subcarrier mapping on the spread signal, perform spectrum shaping on subcarriers by using a spectrum shaping factor to obtain a shaped signal, and obtain a non-orthogonal Faster-Than-Nyquist signal according to the shaped signal; and
a transmitting unit configured to transmit the non-orthogonal Faster-Than-Nyquist signal,
wherein
the spectrum shaping factor includes an amplitude shaping factor,
the processing unit performs spectrum shaping on the subcarriers by using the amplitude shaping factor, to reduce power of subcarriers truncated due to non-orthogonal Faster-Than-Nyquist modulation.

2. The electronic device of claim 1, wherein
the amplitude shaping factor for each subcarrier is determined according to frequency-domain values of a specific pulse function.

3. The electronic device of claim 1, wherein
the amplitude shaping factor for each subcarrier is determined according to power levels of subcarriers with truncated spectrum and subcarriers without truncated spectrum in non-orthogonal Faster-Than-Nyquist modulation.

4. The electronic device of claim 1, wherein
the spectrum shaping factor further includes a phase shaping factor,
the processing unit further performs spectrum shaping on the subcarriers by using the phase shaping factor, to reduce influence of non-orthogonal Faster-Than-Nyquist modulation on a high peak-to-average power ratio.

5. The electronic device of claim 1, further comprising:
a receiving unit configured to receive shaping indication information indicating whether spectrum shaping is to be performed,
the processing unit determines whether to perform spectrum shaping on the subcarriers by using the spectrum shaping factor to obtain the shaped signal according to the received shaping indication information.

6. The electronic device of claim 1, further comprising:
a receiving unit configured to receive a reference signal,
the processing unit further determines the spectrum shaping factor according to the reference signal.

7. The electronic device of claim 1, further comprising:
a receiving unit configured to receive transfer function type information and information about a time-domain compression factor of non-orthogonal Faster-Than-Nyquist modulation,
the processing unit further determines the spectrum shaping factor according to the transfer function type information and the information about the time-domain compression factor of the non-orthogonal Faster-Than-Nyquist modulation.

8. A spectrum shaping method for non-orthogonal waveforms, comprising:
performing discrete Fourier transform spreading on data to be transmitted to obtain a spread signal;
performing subcarrier mapping on the spread signal;
performing spectrum shaping on subcarriers by using a spectrum shaping factor to obtain a shaped signal;
obtaining a non-orthogonal Faster-Than-Nyquist signal according to the shaped signal; and
transmitting the non-orthogonal Faster-Than-Nyquist signal,
wherein
the spectrum shaping factor includes an amplitude shaping factor, performing spectrum shaping on subcarriers by using the spectrum shaping factor to obtain the shaped signal comprises:

performing spectrum shaping on the subcarriers by using the amplitude shaping factor, to reduce power of subcarriers truncated due to non-orthogonal Faster-Than-Nyquist modulation.

* * * * *